United States Patent [19]

Collette et al.

[11] Patent Number: 4,889,247

[45] Date of Patent: Dec. 26, 1989

[54] PLASTIC CONTAINER, PREFORM FOR AND METHOD OF MAKING SAME

[75] Inventors: Wayne N. Collette, Merrimack; Suppayan M. Krishnakumar, Nashua, both of N.H.

[73] Assignee: Continental PET Technologies, Inc., Norwalk, Conn.

[21] Appl. No.: 245,374

[22] Filed: Sep. 16, 1988

[51] Int. Cl.⁴ .................. B65D 1/02; B65D 23/00; B29C 49/08; B29C 49/64

[52] U.S. Cl. ..................... 215/1 C; 215/31; 428/35.7; 428/542.8; 264/25; 264/235; 264/346; 264/521; 264/532; 264/535

[58] Field of Search ............... 215/1 C, 31; 428/35.7, 428/36.6, 36.7, 542.8; 264/25, 235, 346, 520, 521, 532, 535

[56] References Cited

U.S. PATENT DOCUMENTS

| | | | |
|---|---|---|---|
| 4,179,488 | 12/1979 | Nishikawa et al. | 264/521 |
| 4,379,099 | 4/1983 | Ota et al. | 215/1 C X |
| 4,431,398 | 2/1984 | Aoki | 264/521 X |
| 4,572,811 | 2/1986 | Ota et al. | 264/25 |
| 4,589,559 | 5/1986 | Hayashi et al. | 215/31 X |
| 4,590,021 | 5/1986 | Ota et al. | 264/25 |

FOREIGN PATENT DOCUMENTS

| | | | |
|---|---|---|---|
| 136222 | 4/1985 | European Pat. Off. | 215/1 C |
| 0138417 | 8/1984 | Japan | 264/521 |
| 60-96435 | 5/1985 | Japan | 264/520 |
| 1244738 | 10/1986 | Japan | 215/1 C |

*Primary Examiner*—Sue A. Weaver
*Attorney, Agent, or Firm*—Charles E. Brown; Paul Shapiro; Charles A. Brown

[57] ABSTRACT

In the blow molding of a container from a preform in a heated blow mold wherein the container has formed as part of the preform a neck portion which remains unoriented, there is a tendency for the neck portion to distort relative to the body so that there is a perpendicularity problem. In accordance with this invention, the problem has been solved by either crystallizing that portion of the preform which remains unoriented in the blow molding of the container so as to both provide a clear line of demarcation between the unoriented and biaxially oriented portion of the container and to increase the glass temperature of the preform portion so as to prevent shrinkage due to conductive heating. In accordance with another form of the invention, that portion of the preform immediately below the neck portion is provided with an exterior weakening ring or notch which also provides a clear line of demarcation between the oriented and unoriented portion of the container so as to eliminate differential radial shrinkage and existing perpendicularity problems.

16 Claims, 2 Drawing Sheets

PLASTIC CONTAINER, PREFORM FOR AND METHOD OF MAKING SAME

This invention relates in general to the forming of blow molded plastic containers and more particularly to PET plastic containers having an uppermost neck finish terminating in a projecting annular flange and wherein below the neck finish the container rapidly increases in diameter in a shoulder portion which blends into the body of the container.

In the customary reheat blow molded container, the neck finish and an annular part of the resulting container immediately below the flange of the neck finish are unoriented. Then there is a rapid orientation transition in the shoulder portion with there being a maximum biaxial orientation in the body. Such containers for hot fill applications are normally blow molded within heated molds having a temperature at the completion of the blow molding operation which is greater than the glass temperature of the particular PET from which the container is formed. This orientation and thermal conditioning process increases the relative Tg of the oriented regions to a level substantially above the unoriented amorphous regions. As a result of the high mold temperature and low Tg of the unoriented PET, the unoriented annular part immediately below the flange shrinks upon mold opening to excess with a resulting tilting of the neck finish relative to the container body. This invention relates to the elimination of this problem of perpendicularity.

Most particularly, this invention relates to providing a preform with an annular part immediately below the projecting annular flange of the neck finish of the preform of a different thermal stability from that of the adjacent portion of a shoulder forming portion of the preform. In a preferred embodiment of the invention, the annular part is crystallized so as to resist distortion when heated to the temperature of the blow mold in which the preform is inflated into a container. In an alternative form of the invention, the annular part is provided with an external annular groove which weakens the preform in the annular part and thus permits the container shoulder and body to be formed without distortion which would cause a perpendicularity problem. Both solutions when used independently or together resolve post mold finish perpendicularity problems which in turn greatly improves container filling and capping efficiency.

With the above and other objects in view that will hereinafter appear, the nature of the invention will be more clearly understood by reference to the following detailed description, the appended claims, and the several views illustrated in the accompanying drawings.

Figure 1:
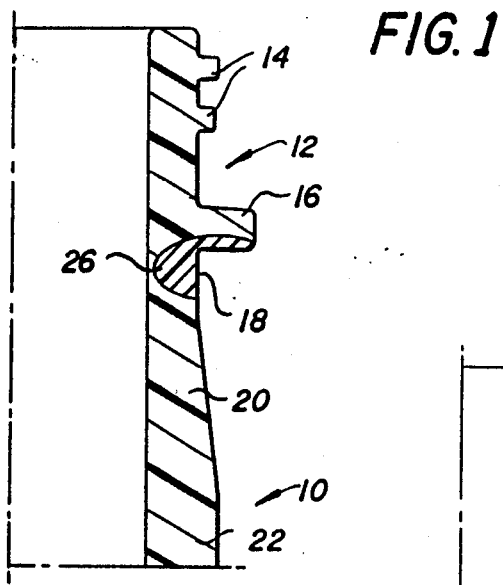
FIG. 1 is a fragmentary half section sectional view taken through an upper portion of a preform formed in accordance with a preferred embodiment of the invention.

First of all, it is to be understood that this invention relates to the forming of containers from a saturated polyester, preferably polyethylene terephthalate (PET) wherein a preform formed of such plastic is molded to include a neck finish which terminates in a lower projecting annular flange or capping ring, which neck finish is disposed externally of the blow mold and the forming of a container by blow molding. Normally the neck finish is not heated at all during the reheat process. The annular part of the preform immediately below the flange is partially shielded from direct radiation to assist in the thermal protection of the neck finish. Although partially heated via conduction from the body, the annular ring temperature is not adequate to permit orientation stretching. The net result is that in the blow molded container, the neck portion of the container remains amorphous as does that of the annular part of the preform immediately below the flange. This annular region is unoriented followed by a rapid orientation transition in a shoulder portion of the resultant container. Because of the problems in heating the preform close to, but spaced from the neck portion, there is not always a planar line of demarcation between the unoriented part of the container and the biaxially oriented part of the container. This results in a relative twisting between the neck portion and the shoulder portion of the container which is described in the industry as a perpendicularity problem, i.e. a cocking of the neck portion relative to the remainder of the container.

In addition, the glass temperature of the unoriented plastic is normally below the temperature of the blow mold at the end of a blow molding operation with the result that the annular part becomes heated above the glass temperature and there is a shrinkage of this annular part further contributing to the perpendicularity problem. For example, unoriented PET has a Tg of 170° F. whereas the adjacent portion of the blow mold will become heated to a temperature on the order of 180°-220° F.

Crystallization of portions of containers formed of PET and like plastics is known in the industry. For example, Ota et al 4,572,811, granted Feb. 25, 1986 teaches the crystallization of various portions of PET containers.

More particularly, Hayashi et al 4,589,559 granted May 20, 1986 teaches that the entire neck portion of the preform including the projecting annular flange and a small portion of the annular part below the flange be crystallized so as to resist distortion and shrinkage of the thread finish when a hot fill product is poured into the associated container through the neck portion thereof. This patent in no way addresses the problem of perpendicularity nor suggests a solution thereto. Further, except when the container is to be utilized in conjunction with a hot fill product, crystallization of the neck is undesirable because it results in the densification of the plastic material in the neck portion causing distortion and a reduction in as molded tolerances of the threads of the neck portion.

Reference is now made to FIG. 1 wherein a preferred embodiment of the invention is illustrated by way of a preform which is generally identified by the numeral 10. It is to be understood that the preform 10 is of a known configuration and includes an upper neck portion 12 which may also be identified as the neck finish. The neck portion 12 is generally provided with threads 14 for receiving a closure cap and terminates in a projecting annular flange 16 which may also be referred to in the trade as a capping ring.

Immediately below the flange 16, the preform 10 is provided with a short cylindrical portion 18 which, in the heating of the preform prior to the blow molding of the preform in a blow mold, is not heated to an orientation temperature. Below this short cylindrical portion 18 the thickness of the preform gradually increases in what is described as a shoulder forming portion 20. Below the shoulder forming portion 20, the preform becomes generally of a constant thickness and becomes a body forming portion 22. The perpendicularity problem addressed by this invention is in the portion 18.

Figure 3:
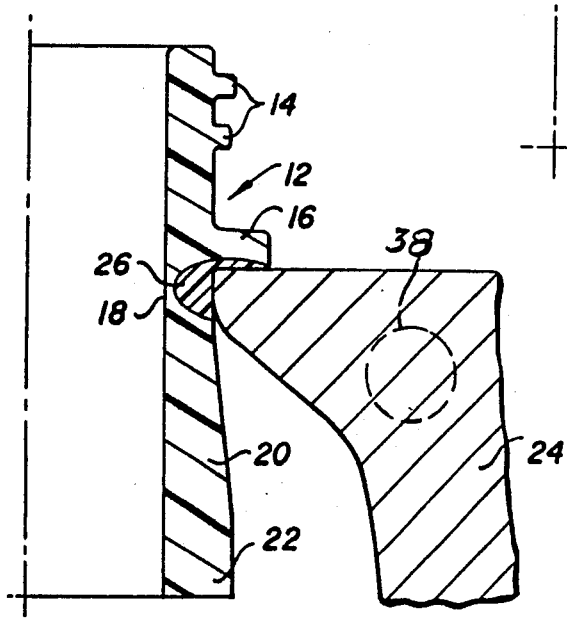
FIG. 3 is a fragmentary sectional view showing the preform positioned in a blow mold.

As will be apparent from FIG. 3, when the preform 10 is initially clamped in a split blow mold 24, the portion 18 is engaged by the blow mold 24 so as to generally prevent either an increase in diameter or an axial elongation of the portion 18. On the other hand, the portion 18 becomes heated during the blow molding operation to a temperature above the glass temperature of the plastic with the resultant shrinkage and deformation. In addition, the usual preform has nothing to provide for a clear line of demarcation between the unoriented portion and the biaxially oriented shoulder portion of the resultant container. Such an undefined line of demarcation also contributes to the perpendicularity problem.

Referring once again to FIG. 1, it will be seen that there is illustrated a shaded area at the top of the cylindrical portion 18 which defines a thermally crystallized ring or annular part 26. The crystallinity is preferably between 30 and 45 percent with the result that the plastic material of the preform 10 is more dense in this area and the glass temperature is greatly increased.

Figure 2:
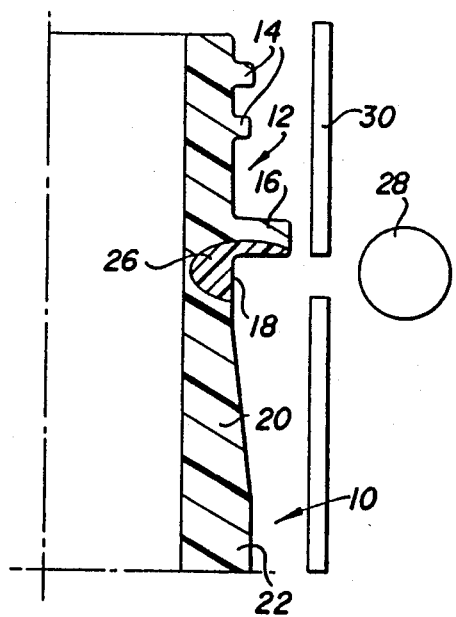
FIG. 2 is a sectional view similar to FIG. 1 and schematically shows the manner in which a selected part of the preform is crystallized.

Referring now to FIG. 2, it will be seen that the thermally crystallized ring 26 is formed by rotating the preform 10 about its axis while it passes along a quartz infrared heater 28. A mask 30 is positioned between the heater 28 and the preform 10 so as to restrict the area which is heated and thus crystallized. While it is preferred that the ring 26 be restricted to the cylindrical portion 18, the heating and thus crystallization may extend into the underside of the flange 16 as is clearly shown in FIG. 1.

Figure 4:
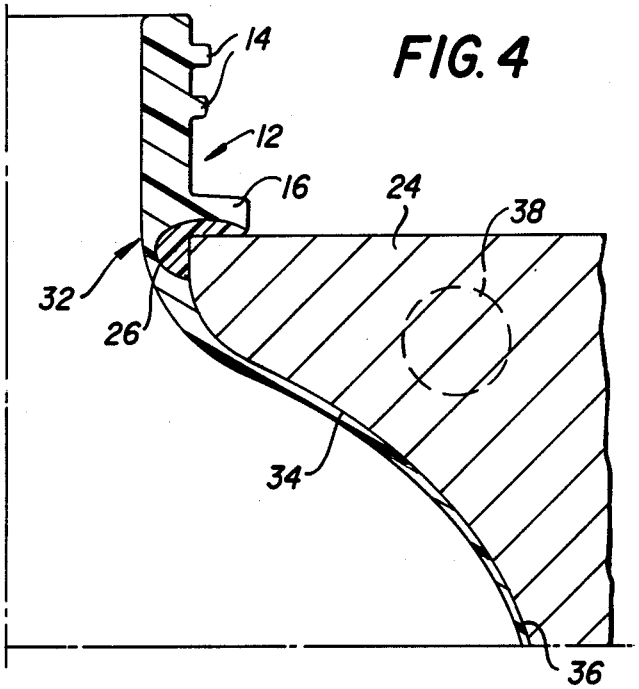
FIG. 4 is a fragmentary sectional view showing the preform having been blow molded within the blow mold to form a container.

In order to blow mold the preform 10 into a container 32 shown in FIG. 4, in addition to crystallizing the ring 26, the preform generally below the ring 26 is heated to a blow molding temperature prior to placing in the mold 24. It will be seen that the flange 16 generally seats on the mold and the cylindrical portion 18, including the crystallized ring 26 is generally clamped within the mold. Then a blowing gas is introduced into the preform through the open upper end thereof with the result that the preform is blow molded within the mold 24 in a conventional manner. Generally speaking, the length of the preform within the mold is increased by 100 percent and the hoop dimension in the body is increased on the order of three. It will also be apparent by comparison of FIGS. 3 and 4 that the portion 18 does not increase in diameter and there is substantially no axial elongation so that the crystallized ring 26 remains unoriented while a shoulder portion 34 of the container is stretched axially and also increasingly in the hoop direction as the shoulder portion 34 opens into a body portion 36.

The crystallized ring 26 has two functions. First of all, because the crystallized ring is denser and the glass temperature has increased, for all practical purposes no distortion occurs in the crystallized ring 26 through its engagement with the relatively hot mold surface. Incidentially, depending upon the molding operation, the mold 24 may be provided with suitable heater means which are schematically illustrated and identified by the numeral 38. Further, it will be seen that the crystallized ring 26 provides a positive line of demarcation between the unoriented upper part of the resultant container 32 and the oriented portion. Since this line of demarcation lies substantially in a plane normal to the axis of the preform and resultant container, there is no distortion of the neck portion 12 relative to the remainder of the container. That is, the axis of the neck portion 12 remains the same as the axis of the remainder of the container so that there is no tilting or cocking of the neck portion 12 relative to the body of the container and perpendicularity is maintained.

Further, by maintaining positively the nonoriented area, there is provided rapid orientation transition at a controlled location. In addition, by restricting the crystallization to the ring 26, there is no overheating of the neck portion or finish 12 which will alter critical thread dimensions.

Figure 5:
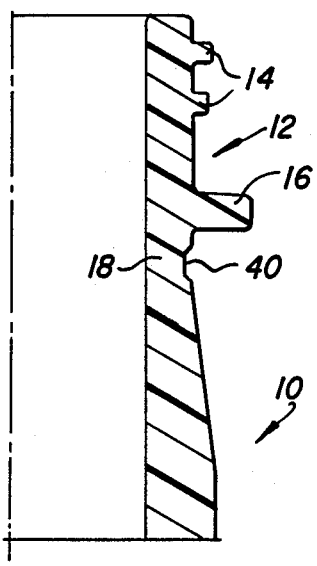
FIG. 5 is a fragmentary sectional view similar to FIG. 1 and shows a modified form of the invention.

Reference is now made to FIG. 5 wherein there is illustrated a modified way of solving the perpendicularity problem. As opposed to providing the preform with a crystallized ring immediately below the flange 16, advantageous results have been obtained by providing the exterior of the preform immediately below the flange 16 with an annular notch or groove 40. It will be seen that the annular notch 40 first of all provides a weakening ring so that instead of the cylindrical part of the preform immediately below the flange 16 being stronger than the adjacent portion of the preform, it is weaker. Thus during the blow molding of the preform 10 into the container, there will be a slight elongation of the unoriented part defined by the notch 40 thereby providing a clear line of demarcation between the unoriented part of the container and the biaxially oriented part. This permits the neck portion 12 to remain square with respect to the remainder of the container.

Although only two preferred embodiments of the invention have been specifically illustrated and described, it is to be understood that further variations may be made in the invention without departing from the spirit and scope of the invention as defined by the appended claims. For example, improved results may be obtained if the crystallized annular ring below the capping ring is used in conjunction with the orientation demarcation groove.

We claim:

1. A plastic preform for forming a hollow blow molded plastic container, said preform being of an injection molded construction and including a neck portion including a lower support flange, a shoulder defining portion next to said support flange, and a body forming portion, said preform being improved by a part of said shoulder defining portion being of a strength different from the strength of an adjacent part of said shoulder defining portion, and said change in strength being restricted to said shoulder defining portion of said preform.

2. A preform according to claim 1 wherein said part of different strength is of greater strength.

3. A perform according to claim 1 wherein said part of different strength is of greater strength and is a crystallized part.

4. A perform according to claim 1 wherein said part of different strength is of a lesser strength.

5. A preform according to claim 1 wherein said part of different strength is of a lesser strength and is in the form of an annular notch.

6. A perform according to claim 1 wherein said plastic is polyethylene terephthalate.

7. A hollow blow molded plastic container comprising an unoriented and uncrystallized neck portion, a biaxially oriented body portion, a biaxially oriented shoulder portion between said neck portion and said body portion, and said shoulder portion immediately adjacent said neck portion having an unoriented annular part of a different strength than an adjacent part of said shoulder portion whereby perpendicularity of said neck portion relative to said body portion is assured.

8. A container according to claim 7 wherein said unoriented annular part is crystallized.

9. A container according to claim 7 wherein said unoriented annular part is crystallized and forms means for providing rapid orientation transistion at a controlled location.

10. A container according to claim 7 wherein said unoriented annular part is crystallized and provides means for preventing post mold shrinkage of said unoriented annular part.

11. A container according to claim 7 wherein said unoriented annular part is of a reduced thickness.

12. A container according to claim 7 wherein said plastic is polyethylene terephthalate.

13. A method of forming a blow molded hollow plastic container from a molded plastic preform, said method comprising the steps of providing a molded preform having a neck portion including an annular projecting support flange, a neck root portion and a body portion, said neck root portion having an annular part immediately adjacent said support flange of different strength from that of an adjacent part of said neck root portion, heating said preform neck root portion and said body portion, and blow molding said heated preform in a heated blow mold with said annular part remaining free of biaxial orientation while said neck root portion and said body portion are stretched in both an axial direction and a hoop direction to be biaxially oriented and there being rapid orientation transition beginning at said annular part.

14. A method according to claim 13 wherein said annular part of said preform is crystallized and prevents post mold shrinkage of said unoriented annular part to prevent prependicularity problems.

15. A method according to claim 13 wherein said plastic is polyethylene terephthalate.

16. A method according to claim 14 wherein said annular part is defined in said preform by an external groove.

* * * * *